May 8, 1951            O. M. WHITE            2,552,244
CAMERA WITH PARALLAX CORRECTED FOCUSING FINDER
Filed Oct. 6, 1949            2 Sheets-Sheet 1
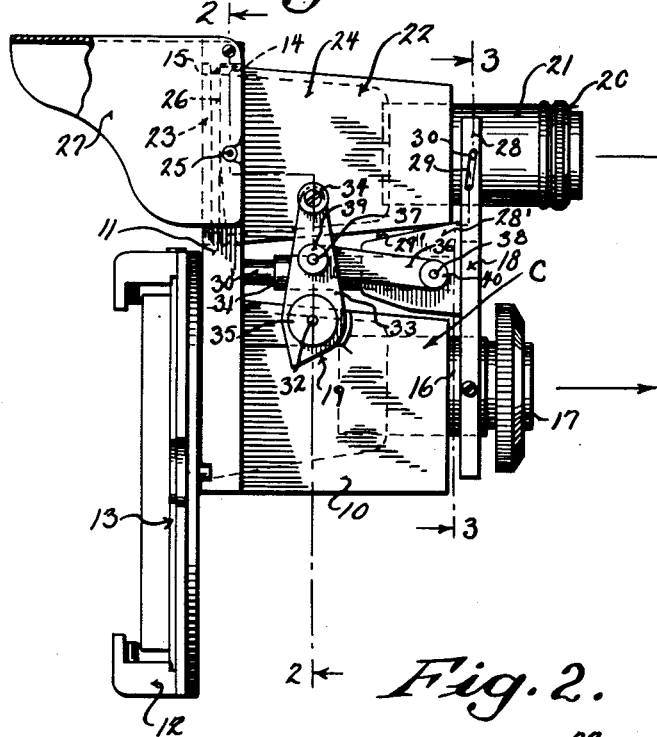
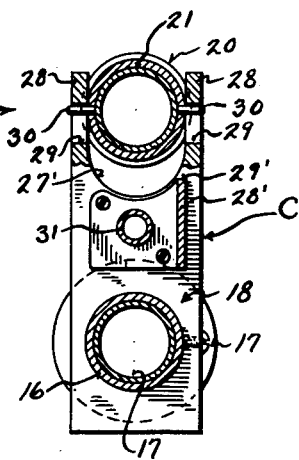
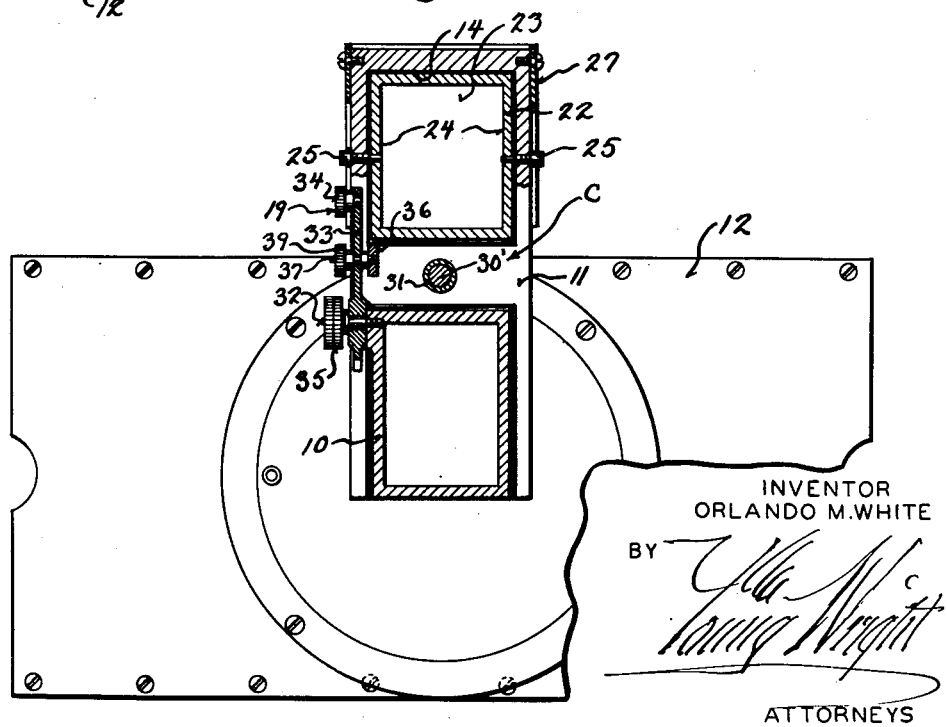
INVENTOR
ORLANDO M. WHITE
BY
ATTORNEYS May 8, 1951   O. M. WHITE   2,552,244
CAMERA WITH PARALLAX CORRECTED FOCUSING FINDER
Filed Oct. 6, 1949   2 Sheets-Sheet 2
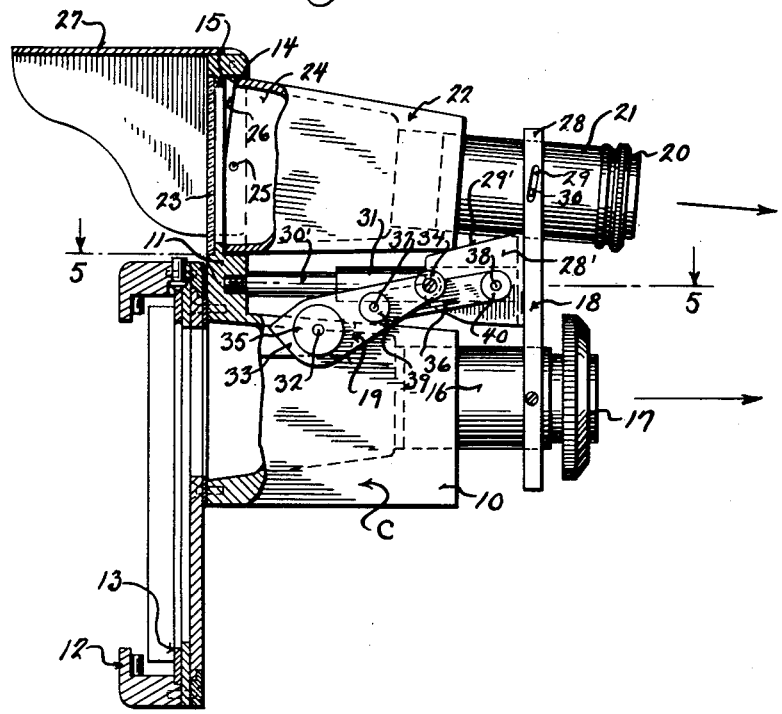
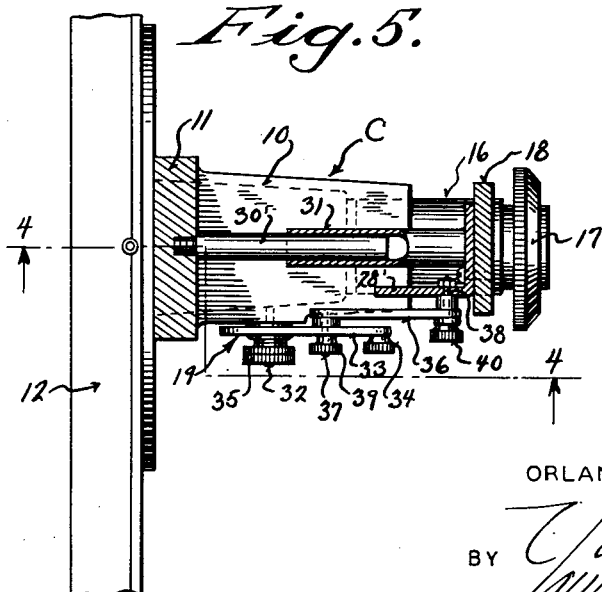
INVENTOR
ORLANDO M. WHITE
BY
ATTORNEYS Patented May 8, 1951

2,552,244

UNITED STATES PATENT OFFICE 2,552,244

CAMERA WITH PARALLAX CORRECTED FOCUSING FINDER

Orlando M. White, Milwaukee, Wis., assignor, by mesne assignments, to Walter G. Nauman, Milwaukee, Wis.

Application October 6, 1949, Serial No. 119,805

2 Claims. (Cl. 95—44)

This invention appertains to cameras of the type embodying focusing lens and objective lens, and more particularly to cameras of the general class known as parallax.

One of the primary objects of my invention is to provide a novel and simple means for automatically operating the focusing lens to create a continuous focal accord with the objective lens during the adjustment of the objective lens.

Another salient object of the invention is to provide means for simultaneously adjusting the focusing lens as to both image distance and axis during the racking or adjusting of the objective lens, whereby the images formed by the focusing lens and the objective lens will be duplicates.

A further object of my invention is to provide a focusing camera in which the ground glass of the finder, upon which is seen the image of the object to be focused, is stationary and the body of the finder is pivoted in such a manner relative thereto that change in image distance and axis relative to the horizontal of the finder or focusing lens will not affect the centering of the image on the ground glass.

A still further object of my invention is to provide novel means for coupling the front plate of the camera carrying the objective lens with the sliding extensible ocular lens-tube of the focusing lens, so that the tube will be slid back and forth with the front plate, said tube and focusing lens being mounted for free swinging movement on the plate, with means on the front plate for raising and lowering the focusing lens and its tube and thus permit the axis of the finder to correspond to the axis of the objective lens.

With these and other objects in view, the invention consists in the novel construction, arrangement and formation of parts, as will be hereinafter more specifically described and claimed, and illustrated in the accompanying drawings, in which drawings:

Figure 1 is a side elevational view of the camera with both the focusing lens and the objective lens adjusted for distance or infinite.

Figure 2 is a vertical, sectional view through the camera taken on the line 2—2 of Figure 1, looking in the direction of the arrows.

Figure 3 is a similar sectional view taken on the line 3—3 of Figure 1, looking in the direction of the arrows and illustrating the novel connection between the front plate and the focusing lens.

Figure 4 is a side elevational view of the camera with parts thereof in section, the parts in section being taken on the line 4—4 of Figure 5, looking in the direction of the arrows, the camera being adjusted for taking close up views.

Figure 5 is a horizontal sectional view, taken on the line 5—5 of Figure 4, looking in the direction of the arrows.

Referring to the drawings in detail, wherein similar reference characters designate corresponding parts throughout the several views the letter C generally indicates a camera constructed in accordance with the invention and the same includes a camera body or box 10 having rigidly secured to its rear face, the upstanding back plate 11. This back plate 11 is open to correspond to the rear end of the camera body or box and this plate has associated therewith a revolving carrier 12 for the film and film carrier 13. This revolving back forms the subject matter of a separate application for patent. The back plate 11 above the camera body or box 10 is provided with an opening 14 having an internal rib 15, the purpose of which will later appear.

Slidably associated with the camera body or box 10 is the tube 16 for the objective lens and shutters 17.

Rigidly secured to the tube 16 for movement therewith is the front camera plate 18 and this plate extends for a distance above the tube 16. Means 19, which will be later set forth is provided for racking or adjusting the lens and tube back and forth relative to the film or plate for image distance.

As brought out in the objects of the specification the camera is of the parallax type and hence includes focusing lens 20 carried by a tube 21. This tube 21 is slidable back and forth in the hollow body 22 of the finder. Seated against the rib 15 of the back plate 11, is a piece of ground glass 23 and the image of the object being photographed is focused on the ground glass.

In accordance with the invention, the finder body 22 is received within the opening 14 ahead of the rib 15 and the side walls 24 of the body are connected with the walls of the opening 14 by pivot pins 25. Hence the finder body, the tubing 21 and the lens 20, are mounted for swinging movement relative to the camera body or box 10, and the back plate 11. It is to be noted that the extreme rear edge of the finder body 22 inclines inwardly as at 26, on opposite sides of the pivot pins 25, so that swinging of the finder body will not be interfered with.

A light hood 27 can be pivotally associated with the back plate 11, for shading the ground glass 23.

The upper end of the front plate 18 is bifurcated as at 27' to receive the tube 21 of the focusing lens 20 and upstanding legs 28 are provided. These legs 28 straddle the tube 21 and the legs have formed therein inclined guide slots 29. The opposite sides of the tube 21 carry guide pins 20 which are received in the slots 29.

From the description so far, it can be seen that as the front plate 18 is adjusted back and forth, that the tube 21 and the lens 20 will be automatically slid back and forth therewith and that the tube 21 is free to raise and lower on the front plate.

The means 19 for adjusting the front plate 18 will now be described. Rigidly secured to the front plate 18 between the objective lens and the focusing lens is a rearwardly extending adjusting plate 28'. The upper edge of the adjustment plate 28' is inclined inwardly and rearwardly as at 29' and in effect the adjustment plate forms a wedge surface. The finder body 22 rests upon this inclined surface and is normally held against the same by the weight of the finder body.

In order to insure smooth operation of the front plate back and forth, a novel guide is provided therefor, and this guide includes a central post 30' rigidly secured to the back plate 11 between the camera body or box 10 and the finder body 22. Slidably mounted upon the post 30' is a guide sleeve 31 and this guide sleeve is in turn rigidly fastened to the rear face of the front plate 18.

Mounted for turning movement on a pivot post 32 is a hand lever or crank 33, and the outer end thereof can be provided with a finger piece 34 for facilitating the turning of this crank. The crank can be held in an adjusted position on its pivot post 32 by means of a lock nut 35, which can be threaded on said pivot post. The lever or crank 33 is operatively connected to the front plate 18 by means of a link 36. The link 36 is connected to the crank 33 intermediate the ends thereof by a pivot pin 37. The forward end of the lever is connected to the adjusting plate 28 by means of a pivot pin 38. If desired, the pivot pin 37 can be rigidly carried by the link 36 and this pivot pin can rotatably extend through the crank 33 and the same can have threaded thereon a nut 39 so that the link can be brought into tight binding contact with the crank when desired. The pivot pin 38 can be rigidly carried, by the adjusting plate 28 and can extend through an opening in the link 36 and the pin 38 in turn can have threaded thereon a lock nut 40 so as to bind the link with the adjusting plate.

In use of the camera the film holder 13 is placed in the revolving back 12 and the camera is then sighted on the desired object. Considering that all of the nuts 35, 39 and 40 are loosened, so that free movement of the crank 33 and link 36 can be had, the crank is turned so as to permit the adjustment of the front plate back and forth, until the desired sharp image is had on the ground glass 23. At this time, the film carrier dark plate can be removed and the shutter actuated for taking the picture. The camera can be maintained in focus during the revolving of the back plate, as is set forth in my co-pending application heretofore mentioned.

During the movement of the crank 33, the front plate carrying the objective lens will be moved back and forth and the tube 21 carrying the focusing lens will be automatically moved back and forth therewith. Considering Figure 1, and that the object is relatively close, then the front plate 18 will be in its rearmost position and consequently the finder body 22 will be resting on the forward edge of the inclined surface 29. The longitudinal axis of the tube 21 will be substantially parallel with the longitudinal axis of the tube 16 of the objective lens. When distant pictures are being taken and the front plate 18 is moved forwardly, then the body 22 of the finder will swing down due to the inclined surface 29. The tube 21 and the focusing lens 20 will likewise swing down and the longitudinal axis of the tube 20 will change relative to the horizontal to agree with the distance of the object and the correct image of the object will be obtained on the ground glass 23.

The mounting of the finder body relative to the ground glass 23 is important, as the arrangement is such that the image will be correctly centered on the ground glass irrespective of the raising and lowering movement of the tube 21 and the focusing lens 20.

Changes in details may be made without departing from the spirit or the scope of this invention, but what I claim as new is:

1. In a camera, a camera body, an objective lens, an objective lens tube slidable in said body, a back plate on said body extending above the body and having a finder opening therein above the body, a ground glass image plate in said opening, a finder body pivotally secured to the side walls of the opening above the body, a focusing lens, a focusing lens tube slidably mounted in the finder body, a front support rigidly secured to the objective lens tube, a rearwardly extending wedge plate rigidly secured to said support between the camera body and the finder body for engaging and supporting the finder body, means pivotally and slidably connecting the support to the focusing lens tube, and means for moving the support back and forth.

2. In a camera, a camera body, a back plate on the body extending above the same and having a finder opening therein, a ground glass image plate in said opening, a finder body disposed above the camera body received in said opening, means pivotally securing the finder body to the side walls of said opening, an objective lens, an objective lens tube slidably mounted in the camera body, a focusing lens, a focusing lens tube slidably mounted in the finder body, a front plate rigidly secured to the objective lens tube having its upper end bifurcated and receiving the focusing lens tube, the sides of said front plate having inclined slots, guide pins on the focusing lens tube received in said slots, a rearwardly extending adjusting plate secured to said front plate having its upper edge inclined downwardly and rearwardly, the finder body having its forward end resting upon said inclined face and supported thereby, and means for moving said front plate back and forth relative to the camera and finder bodies.

ORLANDO M. WHITE.

REFERENCES CITED

The following references are of record in the file of this patent:

UNITED STATES PATENTS

| Number | Name | Date |
| --- | --- | --- |
| 1,856,432 | Rudolph et al. | May 3, 1932 |
| 2,495,355 | Stahl | Jan 24, 1950 |

FOREIGN PATENTS

| Number | Country | Date |
| --- | --- | --- |
| 548,569 | France | Oct. 25, 1922 |
| 712,998 | France | Aug. 3, 1931 |